US008176431B1

(12) United States Patent
Scannell et al.

(10) Patent No.: US 8,176,431 B1
(45) Date of Patent: May 8, 2012

(54) OVERLAY MENUS FOR WEB INTERACTION

(75) Inventors: Patrick S. Scannell, Leesburg, VA (US); Darren M. Culbreath, Locust Grove, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 492 days.

(21) Appl. No.: 11/830,408

(22) Filed: Jul. 30, 2007

(51) Int. Cl.
*G06F 3/00* (2006.01)
*G06F 9/00* (2006.01)
*G06F 17/00* (2006.01)

(52) U.S. Cl. ........ 715/762; 715/763; 715/810; 715/811; 715/967

(58) Field of Classification Search .................. 715/763, 715/762, 810, 819, 811, 820, 828, 829, 841, 715/967
See application file for complete search history.

(56) References Cited

U.S. PATENT DOCUMENTS

| | | | | |
|---|---|---|---|---|
| 5,742,768 | A * | 4/1998 | Gennaro et al. | 709/203 |
| 6,173,316 | B1 * | 1/2001 | De Boor et al. | 709/218 |
| 6,751,306 | B2 * | 6/2004 | Himmel et al. | 379/201.02 |
| 7,039,871 | B2 * | 5/2006 | Cronk | 715/741 |
| 7,076,734 | B2 * | 7/2006 | Wolff et al. | 715/720 |
| 7,113,802 | B2 * | 9/2006 | Sliva | 455/466 |
| 7,197,715 | B1 * | 3/2007 | Valeria | 715/747 |
| 7,529,766 | B2 * | 5/2009 | Shilo et al. | 1/1 |
| 2002/0005867 | A1 * | 1/2002 | Gvily | 345/760 |
| 2002/0049708 | A1 * | 4/2002 | Moneymaker et al. | 707/1 |
| 2003/0084449 | A1 * | 5/2003 | Chane et al. | 725/46 |
| 2003/0110449 | A1 * | 6/2003 | Wolfe | 715/522 |
| 2003/0132961 | A1 * | 7/2003 | Aarts et al. | 345/760 |
| 2003/0146937 | A1 * | 8/2003 | Lee | 345/781 |
| 2003/0208409 | A1 * | 11/2003 | Mault | 705/26 |
| 2004/0205575 | A1 * | 10/2004 | Wattenberg | 715/513 |
| 2004/0207658 | A1 * | 10/2004 | Awada et al. | 345/747 |
| 2005/0039141 | A1 * | 2/2005 | Burke et al. | 715/810 |
| 2005/0086636 | A1 * | 4/2005 | Sobeski et al. | 717/103 |
| 2005/0096066 | A1 * | 5/2005 | Lee | 455/456.1 |
| 2005/0108406 | A1 * | 5/2005 | Lee et al. | 709/228 |
| 2005/0218224 | A1 * | 10/2005 | Boldin | 235/386 |
| 2006/0136822 | A1 * | 6/2006 | Kelly | 715/530 |
| 2006/0178900 | A1 * | 8/2006 | Shilo et al. | 705/1 |
| 2006/0184620 | A1 * | 8/2006 | Melet et al. | 709/203 |
| 2007/0022419 | A1 * | 1/2007 | Subbarao et al. | 717/173 |
| 2007/0130125 | A1 * | 6/2007 | Holte | 707/3 |
| 2008/0062127 | A1 * | 3/2008 | Brodersen et al. | 345/158 |

* cited by examiner

*Primary Examiner* — Tadeese Hailu
*Assistant Examiner* — Anita D Chaudhuri

(57) ABSTRACT

A web-browser add-on is described herein that is configured to enable a web browser to present a menu of options with a web page in a web-browser window. The options are determined by various web-surfing characteristics, device information, network-authentication information, or other user-centric information. Users can initiate the menu by selecting an option or hovering a mouse pointer over a portion of the web page. The options are then determined and presented along with the web page to the user.

19 Claims, 6 Drawing Sheets

OVERLAY MENUS FOR WEB INTERACTION

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed to presenting a menu of options with a web page in a web-browser window. On a client computing device, an indication to display the menu is received. Based on web-surfing characteristics, options are determined for the menu. The menu is then populated with the determined options and presented to the user within the web-browser window.

Another aspect of the invention is directed to a graphical user interface for displaying a menu of options along with a web page. A first display area is configured for presenting the web page in a web-browser window. And a second display area is configured for presenting the menu of options related to the web page in the web browser, wherein the menu is overlaid on top of a portion of the web page.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
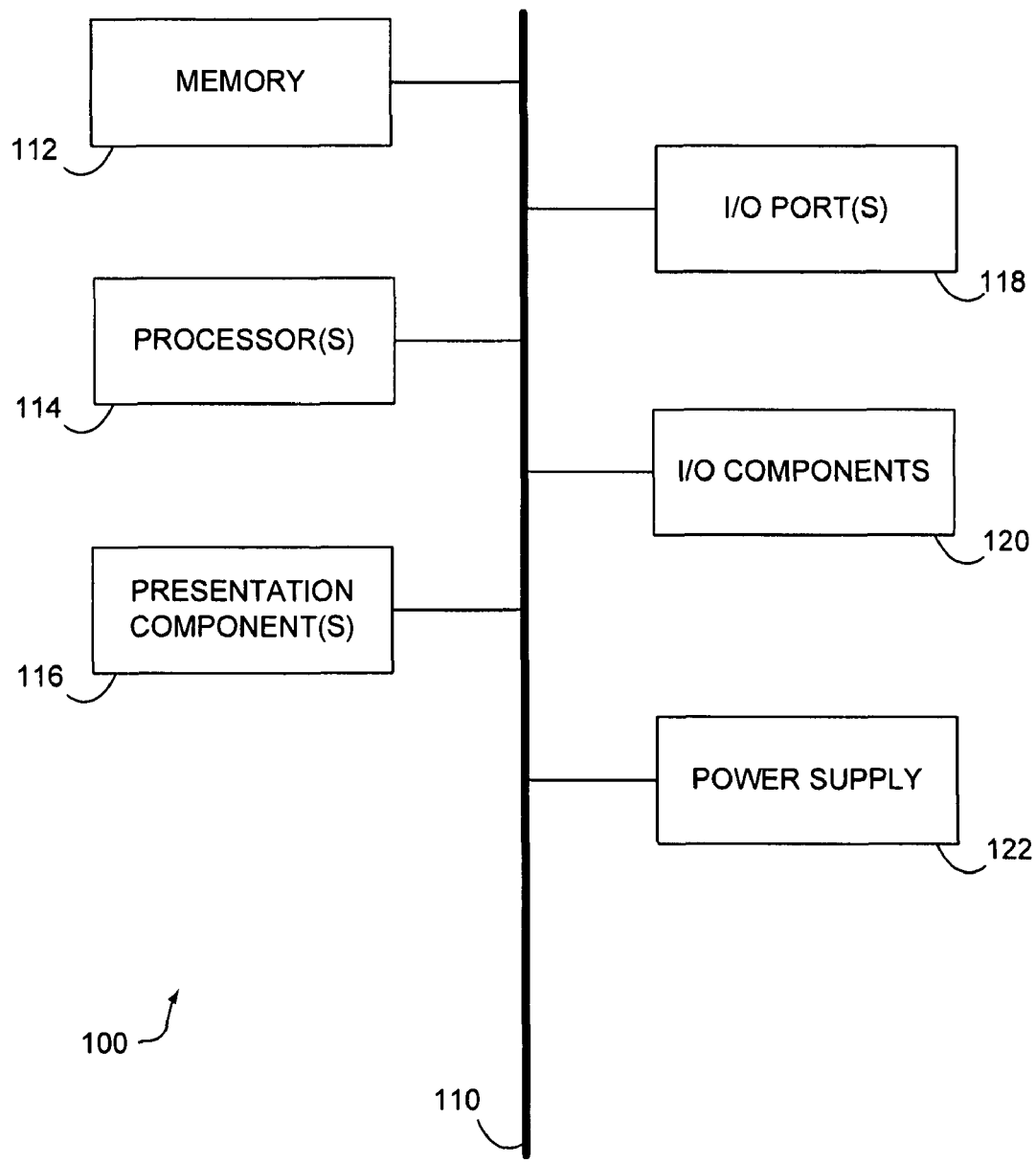
FIG. 1 is a block diagram of an exemplary operating environment for use in implementing an embodiment of the present invention.

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

Various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein, but are not intended to limit the scope of the present invention. The definition and terms should be interpreted broadly and liberally to the extend allowed the meaning of the words offered in the above-cited reference.

Embodiments of the invention generally relate to an Internet menu that is presented as an overlay on top of a web page rendered in a web browser. The menu provides various options to a user, some of which may be unique to the user's personal information, web-surfing history, geographic location, or other indicia. In other words, a menu presented to one user may contain different options than a menu presented to another. Moreover, the user can optionally call the menu any time a browser window is open. Once displayed, the user can interact with the various options.

In one embodiment, the menu is called by selecting a button (hereinafter referred to as "the menu button") in the toolbar of a web-browser window. When the menu button is selected, the menu is rendered over a portion of a displayed web page. When options within the menu are selected by the user, an option menu is presented over another portion of the web page. The option menu presents additional options related to the option in the menu selected by the user. For example, if the user selects an audio option in the menu, the option menu may contain options for playing, searching for, and downloading music. In another example, if a help option is selected, the option menu may be populated with frequently asked questions (FAQs) about the underlying rendered web page. Embodiments are not limited to any particular options presented in the menu or the option menu.

One skilled in the art will understand that various options may be presented in either overlay. For example, the menu may offer the user access to enhanced web content, an online vault, audio configurations and files, video configurations and files, online communities, help options, or the like. For each option selected by the user, a plethora of options are also possible and may be presented in the option menu. In one embodiment, the online vault is a portion of memory that allotted to a user for storing images, purchase items online, maintain contacts or wallet-type information (e.g., age, name, social security number, etc.), or the like. Embodiments are not limited to any particular option presented in either the menu or the option menu.

Embodiments described herein may be embodied as, among other things: a method, computer-program product, or graphical user interface (GUI). Accordingly, the embodiments may take the form of a software embodiment or a GUI embodiment. In one embodiment, the present invention takes the form of a computer-program product that includes a computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include, without limitation, computer-useable instructions, data structures, program module, and other data representations. Computer-storage media include, but are not limited to Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, and magnetic disk storage.

Communications media include any information-delivery media. By way of example but not limitation, communications media include wired media, such as a wired network or direct-wired connection, and wireless media. Combinations of the above are included within the scope of computer-readable media.

Having described a general overview of the embodiments described herein, an exemplary operating environment is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a hand-held devices, cellular phones, Worldwide-Interoperability-for Microwave-Access-enabled (WiMAX-enabled) devices, fourth-generation-cellular-enabled (4G-enabled) devices, consumer electronics, general-purpose computers, specialty computing devices, etc.

The invention may be described in the general context of computer code or machine-useable instructions, including computer-executable instructions such as program modules, being executed by a computer or other machine, such as a PDA or other handheld device. Generally, program modules including routines, programs, objects, components, data structures, and the like, refer to code that perform particular tasks or implement particular abstract data types. Each module described herein may represent executable source code written in a well-known language, such as, for example, C, C++, C#, Java, or the like. Additionally, software features (e.g., web-browser add-ons, the menu, or the option menu) described herein may be implemented using code written in a markup or scripting language—for example, without limitation, hypertext markup language (HTML), extensible markup language (XML), JavaScript, VBscript, or the like.

Embodiments described herein may be practiced in a variety of system configurations, such as, for example, computing device 100. Embodiments described herein may also be practiced in distributed computing environments where tasks are performed by remote-processing devices that are linked through a communications network. For example, a computing device 100 may communicate with a server to accomplish different aspects of the embodiments described herein.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, and magnetic disk storage or other magnetic storage devices that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

In operation, computing device 100 is loaded with a software application capable of retrieving and viewing web pages or other online documents. Such an application is commonly referred to as a web browser. Examples of web browsers include, without limitation, Internet Explorer®, Firefox, Mozilla, Opera, or the like. As one skilled in the art will appreciate, web browsers are capable of submitting requests for and rendering web content (e.g., web pages, images, video, audio, etc.).

Figure 2:
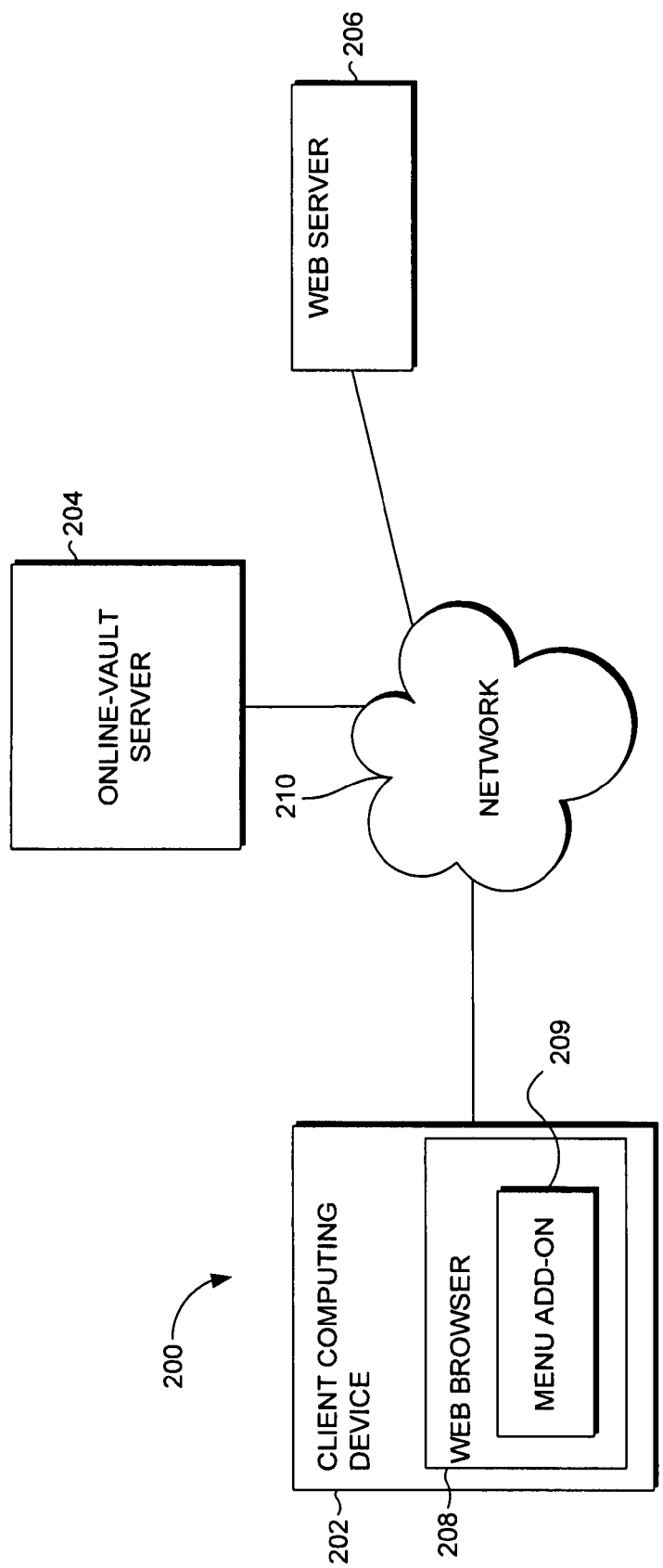
FIG. 2 is a block diagram of an exemplary networking environment for use in implementing an embodiment of the present invention.

Turning now to FIG. 2, a block diagram depicting a networking architecture 200 is shown for use in implementing an embodiment of the present invention. The networking architecture 200 comprises a client computing device 202, a server 204, and a web server 206, all of which communicate with each other via network 210. Networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

The client computing device 202 may be a type of computing device, such as device 100 described above with reference to FIG. 1. By way of example only and not limitation, the client computing device 202 may be a personal computer, desktop computer, laptop computer, handheld device, cellular phone, consumer electronic, digital phone, smartphone, PDA, or the like. It should be noted that embodiments are not limited to implementation on such computing devices.

Network 210 may include a computer network or combination thereof. Examples of networks configurable to operate as network 210 include, without limitation, a wireless network, landline, cable line, digital subscriber line (DSL), fiber-optic line, local area network (LAN), wide area network (WAN), metropolitan area network (MAN), or the like. Network 210 is not limited, however, to connections coupling separate computer units. Rather, network 210 may also comprise subsystems that transfer data between servers or computing devices. For example, network 210 may also include a point-to-point connection, the Internet, an Ethernet, an electrical bus, a neural network, or other internal system. Furthermore, network 210 may include a WiMAX-enabled infrastructure (i.e., components that conform to IEEE 802.16 standards).

In an embodiment where network 210 comprises a LAN networking environment, components are connected to the LAN through a network interface or adapter. In an embodiment where network 210 comprises a WAN networking environment, components use a modem, or other means for establishing communications over the WAN, to communicate. In embodiments where network 210 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

Furthermore, network 210 may also include various components necessary to facilitate communication with a mobile phone (e.g., cellular phone, Smartphone, Blackberry®). Such components may include, without limitation, switching stations, cell sites, Public Switched Telephone Network interconnections, hybrid fiber coaxial cables, wor the like.

The server 204 and the web server 206 may be a type of application server, database server, or file server configurable to perform the methods described herein. In addition, each of the server 204 and the web server 206 may be a dedicated or shared server. One example, without limitation, of a server that is configurable to operate as the server 204 is a PowerEdge® server manufactured by Dell, Inc. headquartered in Round Rock, Tex. The server 204 may also be configured to run server software, such SQL Server® 2005, which was developed by the Microsoft® Corporation of Redmond, Wash., or Apache HTTP Server Project, developed by the Apache Software Foundation.

Components of the server 204 and the web server 206 may include, without limitation, a processing unit, internal system memory, and a suitable system bus for coupling various system components, including one or more databases for storing information (e.g., files and metadata associated therewith). Each server may also include, or be given access to, a variety of computer-readable media. By way of example, and not limitation, computer-readable media may include computer-storage media and communication media. In general, communication media enables each server to exchange data via network 210. More specifically, communication media may embody computer-readable instructions, data structures, program modules, or any information-delivery media. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that networking architecture 200 is merely exemplary. While the server 204 and the web server 206 are illustrated as single boxes, one skilled in the art will appreciate that they are scalable. For example, the server 204 may in actuality include multiple boxes in communication. The single unit depictions are meant for clarity, not to limit the scope of embodiments in any form.

The client computing device 202 comprises a web browser 208, which is a software application enabling a user to display and interact with information located on a web page. In an embodiment, the web browser 208 communicates with the server 204, the web server 206, and other components accessible over the network 210. Web pages may be located by the web browser 208 by sending a transferring protocol and the URL. The web browser 208 may use various URL types and protocols, such as hypertext transfer protocol (HTTP), file transfer protocol (FTP), real-time streaming protocol (RTSP), etc. The web browser 208 also understands a number of file formats—such as HTML, graphics interchange format (GIF), tagged image file format (TIFF), portable document format (PDF), or joint photographic experts group (PDF) file format, and the like—the wealth of which can be extended by downloaded plug-ins. Additionally, the web browser 208 may be any browser capable of navigating the Web, such as Internet Explorer®, Netscape Navigator®, Mozilla®, Firefox®, etc.

In operation, the web browser 208 is configured to send requests, by specifying uniform resource locators (URLs), for web content to a name server (not shown for clarity). Web content may include web pages as well as online images, audio, or video. The name server accesses the domain name system (DNS) to associates the URL with an internet-protocol address (IP address). The IP address refers to the location of web content associated with the URL, and the web browser uses the IP address to connect to the web server 206, where the web content is stored. To request web content, the web browser 208 is configured to send a GET request to the web server 206, asking for the file associated with the URL. In an alternative embodiment, the GET request is sent as a cookie from the web browser 208 to the web server 206. In response to the GET request, the web server 206 is configured to send the web content to the web browser in the form of markup language text, such as HTML, or scripting language. The web browser 208 can then read and display the web content by executing the received markup language text or scripting language.

In one embodiment, an internet service provider (ISP) enables the web browser 208 to connect to the Web. ISPs may employ a range of technologies to make such a connection. For example, the ISP may provide dial-up, digital subscriber line (DSL), WiMAX, broadband wireless access, cable, satellite Internet access, Metro Ethernet, Gigabit Ethernet, or the like. In operation, ISPs provide access to the Internet backbone either directly or by connecting with other ISPs. In the simplest case, a single connection is established to an upstream ISP using one of the technologies described above, and the ISP uses this connection to send or receive any data to or from parts of the Internet beyond its own network. The ISP may use its own connection, or connections to its other customers (e.g., other ISPs) to allow web-content data to travel from a web server 206 to the web browser 208.

One skilled in the art will appreciate that the retrieval of web content may be more complicated. For example, ISPs with more than one point of presence (PoP) may have separate connections to other ISPs at multiple PoPs, or they may be customers of multiple ISPs and have connections to each one at one or more of their PoPs. Moreover, ISPs may engage in peering, where multiple ISPs interconnect with one another at a peering point or Internet exchange point (IX).

In one embodiment, a menu add-on 209 is downloaded to the web browser 208. The menu add-on 209 enables the overlay menus described above to be presented on top of rendered web content in a web-browser window. Once the web browser 208 is configured with the menu add-on 209, a button may be presented in the web browser 208's toolbar that, when selected by a user, will display the menu. Within the menu, various options may be presented to the user. In some embodiments, the options relate to the user's personal information, web surfing history, or provide access to information the user has stored (e.g., MP3s, JPEGs, etc.). The options may be presented as icons in the menu, which may be displayed over any portion of the web-browser window.

After the menu add-on 209 is downloaded to the web browser 208, the web browser 208 is configured to parse web pages written in HTML or extensible hypertext markup language (XHTML). The menu add-on 209 provides the functionality to parse the Document Object Model (DOM) using JavaScript Functions. The menu add-on 209 is configured to connect to the external identity management system via web service APIs and retrieve flags that will identify what types of menus are to be rendered and what options to render within each menu. Menu types or options may be specified by the user during a registration process. For example, a menu's display, color, or presentation (e.g., overlay, underlay, within an options menu, etc.) may be designated by the user. Additionally, the user may also customize which options to present within a menu, including any of those discussed herein.

After downloading the menu add-on 209, the web browser 208 can manipulate the markup language of a web page and place overlay menus in targeted areas of a web-browser window. For example, the menus may be displayed over various portions of a web page—such as, the top, right, left, or bottom. In one embodiment, users can specify which portion of the web page to display the menus in. In another embodiment, the web browser 208 is configured to present the menus on the bottom of the web-browser window by default. The menu add-on 209 enables the web browser 208 to preprocess the markup language of a web page delivered to the web browser and identify the bottom (i.e., footer) and left side bar of the web page. The overlay menu can then be placed along the bottom of the web page and justified against the left side.

The menu add-on 209 includes scripting-language (e.g., JavaScript) code that is configured to create overlays based on mouse hovering events. If the web browser 208 has disabled JavaScript, the menu add-on 209 is configured to notify the user, requesting that the scripting language be enabled. In one embodiment, the user is given a choice of yes or no. If yes, the menu add-on 209 is configured, in one embodiment, to activate the scripting language and render the menu. With the scripting language enabled, the scripting-language code waits for the user to hover a mouse pointer over the vertical and horizontal (i.e., the x/y coordinates) of the bottom and left side of web page. On the event of hover, in one embodiment, the menu is displayed over the web page. In another embodiment, the menu add-on 209 removes the overlay menu when the mouse pointer moves away from bottom portion of the web page. Even though embodiments are described herein with scripting language configured to monitor the bottom portion of a web page, embodiments are not limited to any portion of the web page. Rather, the scripting language may be configured to detect hovering a mouse pointer over any area of a web page or within a web-browser window.

Overlay menus may be written using well-known UI enhancement languages. Examples include, without limitation, Macromedia Flash, JavaScript, and the like. Embodiments are not limited to any particular programming language or technique.

Numerous options may be presented in the menu. Examples include, without limitation, the capability to retrieve enhanced web content, access an online vault, listen to audio files (e.g., MP3s), watch videos, visit online communities, or request help while searching the Web. In one embodiment, an option menu is invoked and presented to the user whenever one of the options in the menu are selected. The option menu may contain various actions related to the selected option. For example, selecting the online vault may invoke a menu with options to view stored photographs, audio files, video files, wallet information (e.g., credit card numbers, social security number, etc.), or other information. While the following description focuses on the aforementioned options, embodiments are not limited thereto. Rather, one skilled in the art will understand that various other options may be included in the menu.

One option may allow the user to retrieve additional web content related to the web page being viewed (referred to herein as "enhanced web content"). The enhanced-web-content option may be configured to provide, at least, three different types of additional web content. Additional web content may be located using any combination of the techniques discussed below. Furthermore, embodiments are not limited to the three types of enhanced content discussed below. One skilled in the art will understand that other methods may be used for locating additional web content.

First, additional web content may be located based on the web content currently rendered in the web-browser window, regardless of the user or client computing device 202's geographic location. In one embodiment, a search-engine query is requested for the content within a displayed web page. For example, if the user is viewing a web page about a particular vehicle, a search may be requested for user review about the truck. The results of such a search can then be presented in the options window. In another example, the history of web pages viewed by the user may be analyzed and hyperlinks to web pages that contain similar web content may be presented in the option menu. For instance, a user who has recently viewed multiple web pages about a particular car may be presented a list of different dealers selling the car.

Second, additional web content may be based on parameters monitored by an ISP. Monitored parameters may include, for example, a geographic location, device presence, user availability, online history, HTML code, account information, user-defined criteria, or the like. Either current or historical geographic locations may be monitored. Device presence refers to whether the client computing device 202 is on or off. A user's online history includes the web pages viewed by a user or on the client computing device 202. HTML code may be analyzed to analyze the text or meta-data of a web page. Account information refers to particular devices connected to a telecommunication network, such as a device type, device name, account number, network access identifier (NAI), mobile identification number (MIN), electronic serial number (ESN), media access control (MAC) address, or the like. User-defined criteria encompasses various user-supplied information. For example, user A may elect to track information about a particular subject, and user B may want to track the number of web pages user B visits, with a scoring system for which pages are most frequently visited. Other parameters are also possible; accordingly, embodiments are not limited to the parameters mentioned herein.

The data collected to populate options within a menu can also include a combination of usage statistics from web-site usage and external behavioral databases. The usage statistics may gathered using well-known web-analytic software—such as software developed by Omniture Inc., headquartered in Orem, Utah, or Clickfox Inc., headquartered in Atlanta, Ga. In one embodiment, external behavior data is originated from 2G/3G usage data from mobile phone usage as well as demographic data from companies such as Axiom or Experian.

Third, additional web content may be specific to the user or the client computing device 202's geographic location. For example, if the user is accessing a web page about the National Football League (NFL), the enhanced web content option may provide links to web pages with content about the NFL team in the user's city. In one embodiment, geographic location is determined by comparing the history of cell-site registrations of the client computing device 202. In another embodiment, a global positioning system (GPS) receiver within the client computing device 202 determines geographic location. In still another embodiment, the IP address associated with the client computing device 202 or a peripheral Internet-connection device (e.g., a cable modem) is used. One skilled in the art will understand that other techniques may also be used to determine geographic location. Examples of determining location may be based on: Cell Sector ID, Cell sector ID plus Timing Advance, Angle of Arrival, Time Difference of Arrival, Enhanced Observed Time Difference (EOTD) of Arrival, Advanced Forward Link Trilateration (AFLT), Enhanced Forward Link Trilateration, Global Position System (GPS), Assisted GPS (AGPS), and Hybrid GPS solutions (e.g., AFLT and AGPS, EOTD and AGPS, Cell ID and AGPS).

Moreover, an online vault may be presented in the menu as an option. The online vault, as discussed herein, refers to a computer-storage medium where various user- or computing-device-specific information is stored. The online vault may be configured to store a user's audio files, video files, images, confidential documents, credit-card information, social security number, cellular-phone contacts, personal identification information, communications (e.g., e-mail, instant messaging, voice mails), or other information. In one embodiment, the server 204 is configured to store and access a user's, or device's, online vault. Records of information may be maintained the server 204's computer-storage media.

In one embodiment, the online vault uses various data and policies to authenticate a user before access to stored content is granted. Validation is required for the client computing device 202 using device-specific information, such as, for example, a MAC address, ESN, NAI, account number, password, or other unique identifier required to authenticate a computing device. Also, the vendors of the online vault may implement a subscription service. For example, when a user initially activates the client computing device 202, the user may be given an option to automatically backup contacts and messaging files to the online vault. Should they subscribe to additional services, such as a virtual backup services, they could configure which folders or files on the client computing device 202 are automatically backed up to the online vault.

Additionally, the online vault may be configured to only be accessible from specific devices that have the ability to access a wireless network. For example, access to the online vault may be limited to a specific computer, digital camera, multimedia player, portable game platform, or car computer and entertainment system. Each device would then be authorized to connect to a wireless network via the device's unique identifiers and authentication protocols of the wireless network. Once a device is connected and authenticated to the wireless network, the online vault compares the requested account number with the unique identifiers of the device and does a lookup to ensure that the account is being accessed from an authorized device. In one embodiment, completion of the access requires a password supplied by a user.

The user may also self-configure various aspects of security parameters associated with the online vault, based upon the user's preferences. For example, a user might specify a need to manually enter the account number every time the online vault is accessed, rather than holding the account number in memory of the device and automatically supplying it to the online vault. Likewise a user may choose to have to manually enter a password, or, alternatively, store it on the device and automatically supply it to the online vault.

Additional preferences may surround which devices can access an online vault of a user. Maximum security would only allow those devices registered to a user to access the online vault of the user. A user may grant access to an online vault to a certain number of devices whose specific identifying information is known and registered to access the account and is presented along with appropriate account number and password information. In this instance, a husband might configure his online vault preferences to allow him to access the online vault from his wife's notebook computer or cell phone. In that instance, he may still need to enter an account number and password for access. The user may also configure the online vault to allow entry from a class of devices—for example, any device may be allowed to access the online vault if the appropriate account number and password is submitted. In this manner, a user who has multiple devices registered on their wireless network account could have access to files, data, messages, etc. stored on other devices registered to them.

The online vault may be configured to integrate the automatic "pre-population," or synchronization, of the online vault contacts into authenticated devices. For example, a user who signs up for the online vault and registers a digital camera may be asked to download their contacts from their Online Vault. This synchronization may be made at the user's discretion. A The user may, for example, elect to synchronize photographs and contacts to a wireless camera, but not audio files. Or a user might want to always synchronize audio files and contacts to a wireless MP3 player, but not photos.

Options for watching digital video or audio files may also be presented to in the menu. The option menus for such options may be littered with functions for searching for different multimedia related to web content displayed in the web-browser window, viewed recently, or relevant to a geographic area. For instance, the option menu may provide the user the ability to watch a local band's concert if the user was searching for music. One skilled in the art will understand that numerous ways of searching for audio and video files are well known, and need not be discussed at length herein.

The menu may also contain a help option that presents tools for assisting the user with web content. In one embodiment, the information help displayed in the option menu is catered to the web content being rendered in the web-browser window. In another embodiment, the information is catered to the user using the client computing device 202. For example, the help option presents frequently asked questions (FAQs) about the web content. In another example, if corrupt audio file is downloaded to the client computing device 202, the option menu may inform the user how to cure any viruses that have been reported from other users downloading the audio file. In another example, the option menu of the help option may present a laundry list of questions and answers from other users who have accessed the web content. One skilled in the art will understand that a plethora of information may be displayed.

Figure 3:
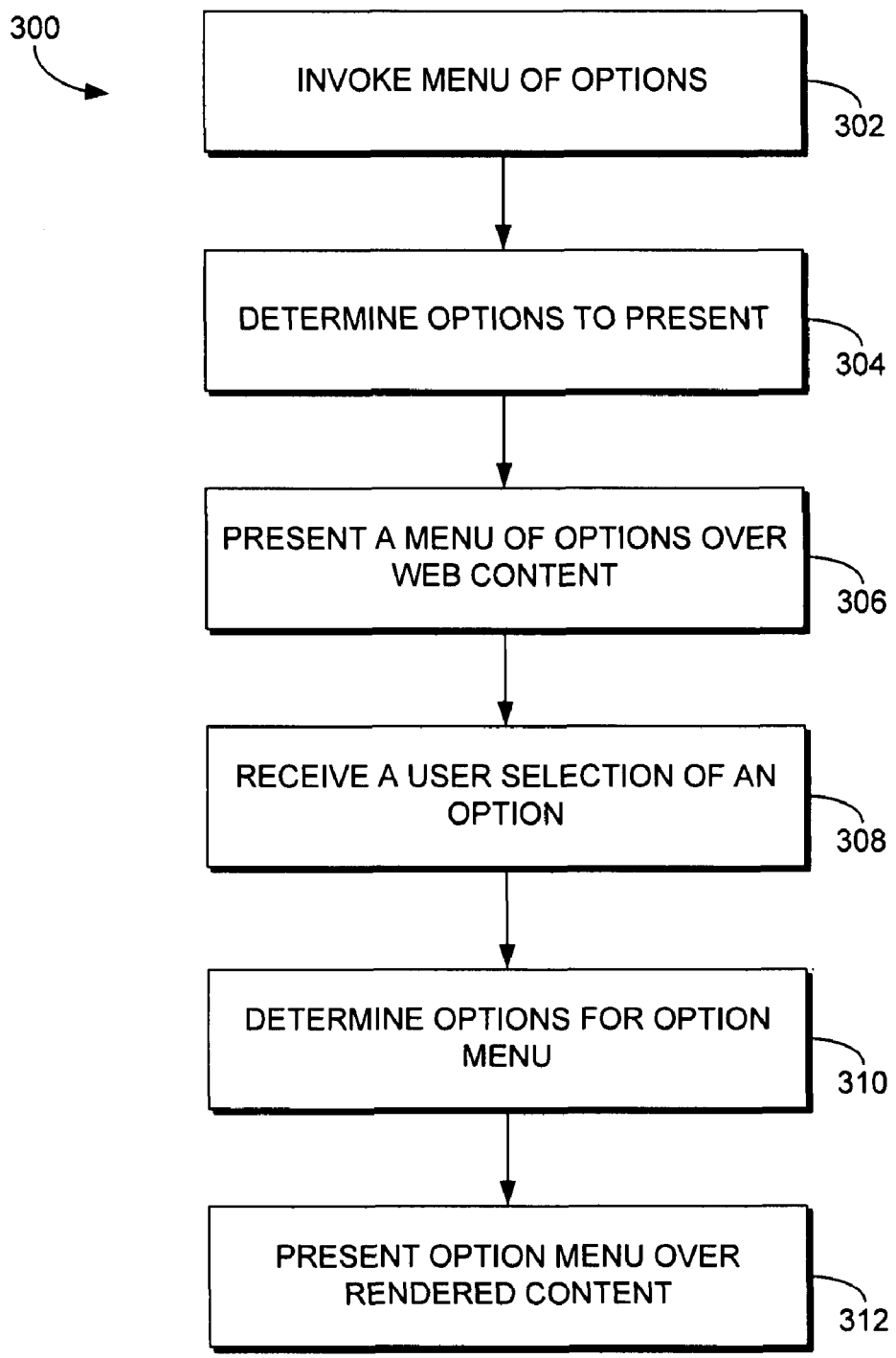
FIG. 3 is a flow chart illustrating a process for displaying a menu over web content, according to an embodiment of the present invention.

Turning now to FIG. 3, a flow chart is shown illustrating a process 300 for displaying a menu over web content, according to an embodiment of the present invention. Initially, a user invokes a menu of options, as indicated at block 302. In one embodiment, the user calls the menu by selecting a button on a web-browser toolbar. Options for the menu are determined, as indicated at block 304, by the web content currently being displayed in the web browser's window, recent web pages that have been viewed, and/or geographic location of the user or a client computing device.

The menu is presented as an overlay of the web content displayed in a web-browser window, as indicated at block 306. To do so, an add-on integrated into the web browser renders HTML text, or scripting language, to overlay the menu on the web content. For each option, the add-on is configured to determine one or more options to present in an option menu, as indicated at block 310. For example, the add-on may be configured to query a search engine for links related to the web content displayed in the web-browser window. If a user selects one of the options in the menu, the option menu is presented as another overlay on the currently displayed web content, as indicated at block 312. The user can then select any of the options in the option menu.

Figure 4A:
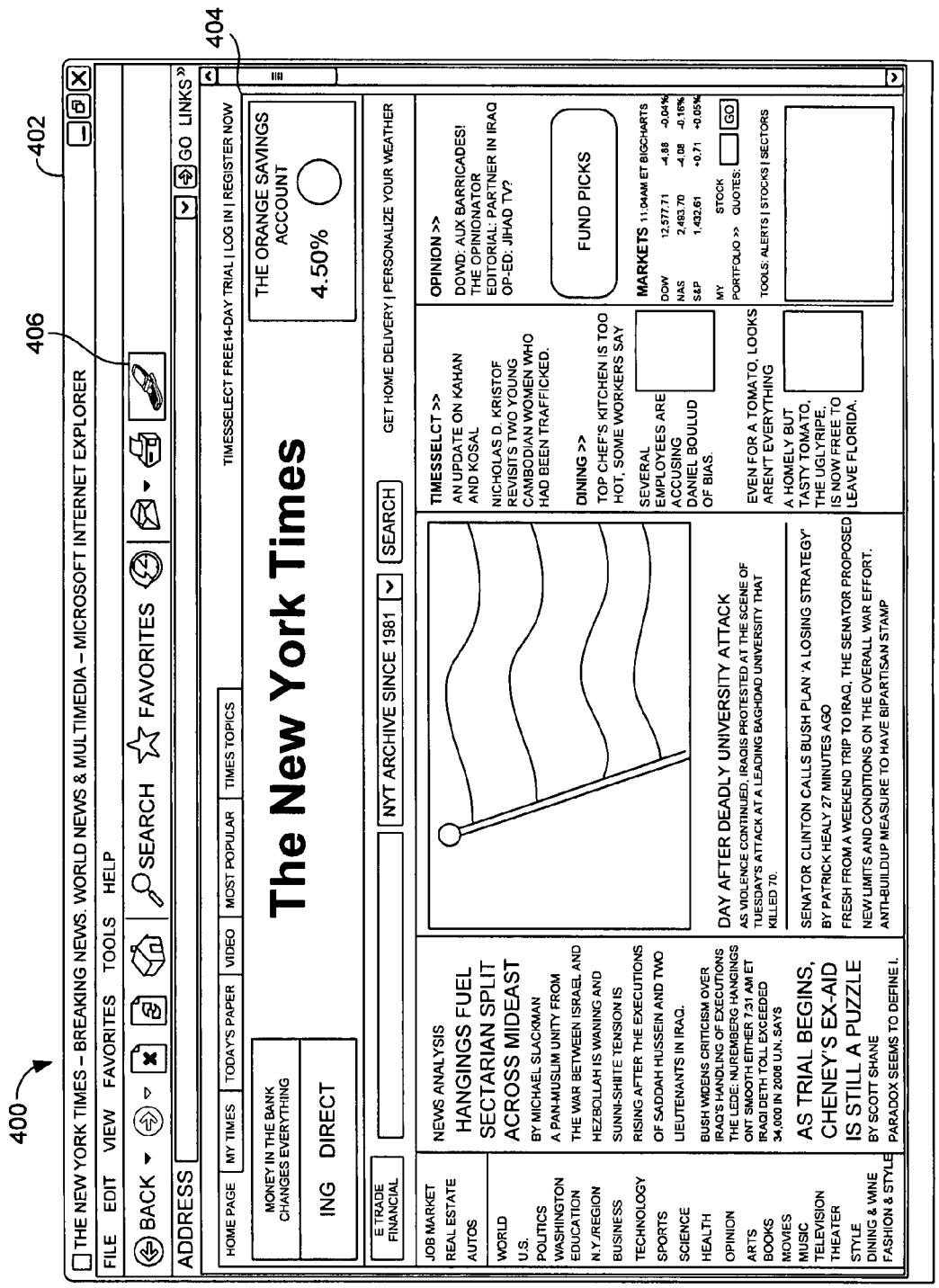
FIGS. 4A-4C are exemplary displays of a graphical user interface for presenting a web browser that renders a menu on web content, according to an embodiment of the present invention.
Figure 4B:
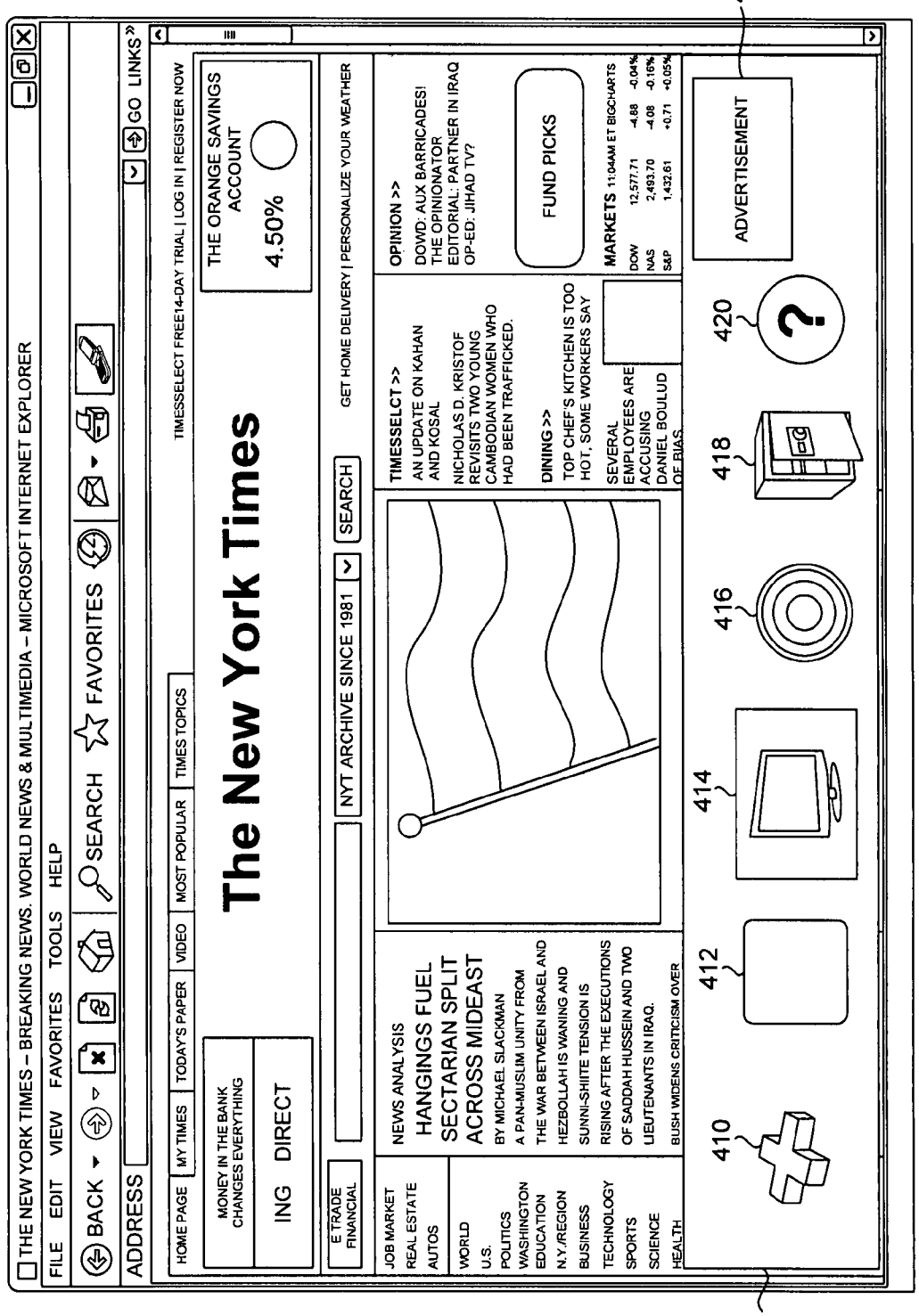
Figure 4C:
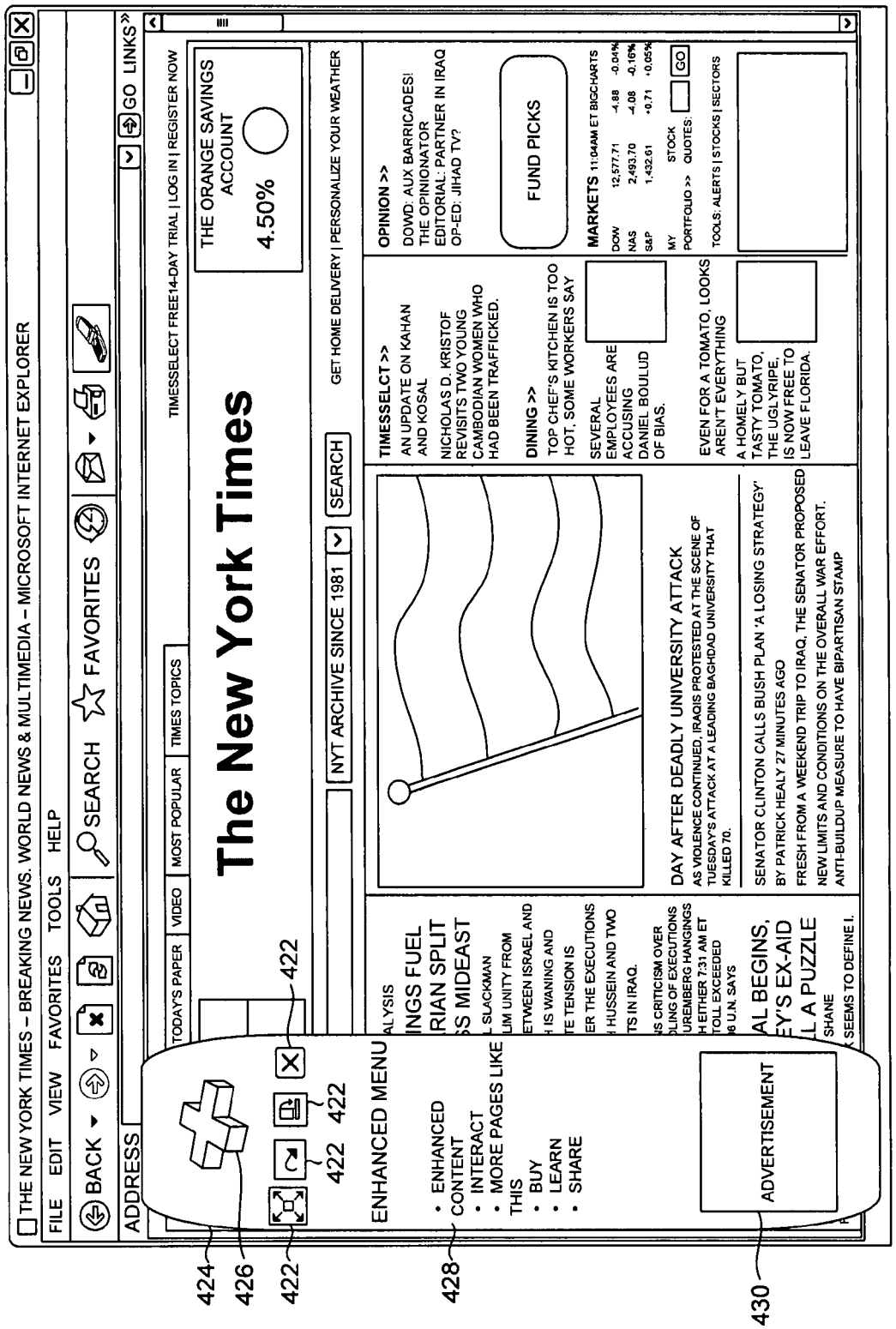

FIGS. 4A-4C illustrate exemplary displays of a graphical user interface 400 for presenting a web browser that renders a menu on web content, according to an embodiment of the present invention. Referring initially to FIG. 4A, a web-browser window 402 displaying a web page 404 is shown. Within the tool bar, a menu button 406 is displayed, which, when selected by the user, is configured to present a menu 408 over the web page 404. The menu 408 is shown in FIG. 4B and contains various options (410-420). As previously stated, options may be presented that are relative to the user, web-surfing history, or geographic location. Indicated in FIG. 4B are options to retrieve enhanced web content (410); locate images (412) (512), video (414), or audio (416) about the web page 404; access an online vault (418); or request help (420). An advertisement 422 may also be displayed within the menu 408. In one embodiment, both the options in the menu 408 and the advertisement 422 are selected for display based on characteristics associated with the user of the web page 404. One skilled in the art will understand that the illustrated options are exemplary, and embodiments may contain others.

Once the user selects an option (referred to as a selected option 426) in the menu 408, an option menu 424 is presented as an overlay on top of the web page 404. Within the option menu 424, various options 428 related to the selected option 424 are presented. The options 428 in the option menu 424 may include results from search queries, hyperlinks, pointers to multimedia files (e.g., MP3s, JPEGs, etc.), or other actions commensurate with the selected option 426. The option menu may also include various controls 422—such as moving, rotating, saving, or closing the option menu 424. Additionally, an advertisement 430 may be displayed in the option menu. The advertisement 430, in some embodiments, is selected for display based on the user characteristics or recently viewed web content.

The invention claimed is:

1. One or more computer-storage media having computer-executable instructions embodied thereon for presenting a menu with a web page that is rendered in a web browser, comprising:

on a client computing device, receiving an indication to display the menu;

based on a web content currently being displayed and one or more web-surfing characteristics for a user that is being monitored, determining one or more options to include in the menu, wherein the one or more web-surfing characteristics comprise web-surfing characteristic pre-defined by the user indicating a desire to monitor that web surfing characteristic, and wherein the one or more web-surfing characteristics comprise a scoring for which web pages the user has historically visited most frequently; and presenting the menu in a graphical user interface with the web page, wherein the computing device connects to an external identity management system using web service application program interfaces and retrieves flags that identify types, design attributes, and presentation of menus that are rendered and identify the one or more options rendered in the menu, wherein the types, design attributes, and presentation of menus specify the menu's display, color, location, and whether the menu or the one or more options are presented as an overlay, an underlay, or within an options menu, and wherein the types, design attributes, and presentation of menus are pre-defined by the user during a registration process specifying how the menu is displayed in the graphical user interface.

2. The media of claim 1, wherein the one or more web-surfing characteristics comprise a determination of the geographic location of a client computing device.

3. The media of claim 1, wherein the menu is presented as an overlay on top of the web page.

4. The media of claim 3, further comprising:

receiving a selection of the one or more options;

based on the one or more web-surfing characteristics, determining a list of options to include in a second menu; and presenting the second menu in the graphical user interface on top of a second portion of the web page.

5. The media of claim 1, wherein the one or more web-surfing characteristics comprise data about web pages that have been recently presented in the web browser.

6. The media of claim 1, further comprising determining geographic location data associated with the client computing device by analyzing at least one member of a group comprising a call sector ID, cell sector ID, angle of arrival, time difference of arrival, EOTD of arrival, AFLT, and enhanced forward link trilateration.

7. The media of claim 1, further comprising determining an advertisement based on the one or more web-surfing characteristics.

8. The media of claim 7, wherein the one or more web-surfing characteristics comprise a content displayed in the web page.

9. One or more computer-storage media having computer-executable instructions embodied thereon for presenting a menu with a web page that is rendered in a web browser, comprising:

on a client computing device, receiving a selection of an option in a first menu, wherein the option is determined by at least one of a web-surfing characteristic for a user that is being monitored, device information associated with the client computing device, or network-authentication information, wherein the one or more web-surfing characteristics comprise an online history of the web pages the user has previously requested;

based on the online history of the user, determining additional options to place in the menu; and presenting the menu in a graphical user interface with the web page, wherein the computing device connects to an external identity management system using web service application program interfaces and retrieves flags that identify types, design attributes, and presentation of menus that are rendered and identify the option and the additional options rendered in the menu, wherein the types, design attributes, and presentation of menus specify the menu's display, color, location, and whether the menu or the additional options are presented as an overlay, an underlay, or within an options menu, and wherein the types, design attributes, and presentation of menus are pre-defined by the user during a registration process specifying how the menu is displayed in the graphical user interface.

10. The media of claim 9, wherein the one or more web-surfing characteristics comprise the content displayed in the web page.

11. The media of claim 9, wherein the one or more web-surfing characteristics comprise the geographic location of the client computing device.

12. The media of claim 11, wherein the geographic location of the client computing device is determined by comparing a registration of the client computing device to at least one cell site.

13. The media of claim 11, wherein the geographic location of the client computing device is determined by a GPS receiver.

14. A graphical user interface embodied on a computer-storage medium and executable on a computer, the graphical user interface comprising:
    a first display area presenting a web page in a web-browser window;
    a second display area presenting a menu of options over the web page, wherein the menu of options performs tasks related to the web page in the web browser, wherein types, design attributes, and presentation of the menu of options are pre-defined by a user during a registration process and specify the menu's display, color, location, and whether the menu of options are presented as an overlay, an underlay, or within the menu of options displayed in the graphical user interface; and
    a third display area overlays an option from the menu of options on top of a second portion of the web page, wherein the option is created and determined by at least one of a web content being displayed in the web page, recent web pages viewed by the user, and a geographic location of the user or the computer.

15. The graphical user interface of claim 14, wherein the device information associated with the client computing device includes one of at least a network access identifier (NAI), mobile identification number (MIN), electronic serial number (ESN), or media access control (MAC) address.

16. The graphical user interface of claim 14, further comprising a third display area for presenting an advertisement that is related to one or more web-surfing characteristics.

17. The graphical user interface of claim 14, wherein the one or more web-surfing characteristics comprise a geographic location of a client computing device presenting the web-browser window.

18. The graphical user interface of claim 14, wherein the options comprises access to an online vault that is configured to store user-specific information.

19. The graphical user interface of claim 18, wherein the user-specific information includes at least one of an audio file, image file, video file, or wallet information.

* * * * *